Oct. 19, 1937.  O. B. ENGLISH  2,096,392
LINE SHOCK ABSORBER
Filed May 13, 1936  2 Sheets-Sheet 1

Inventor
Orville B. English
By Clarence A. O'Brien and Hyman Berman, Attorneys

Oct. 19, 1937.   O. B. ENGLISH   2,096,392
LINE SHOCK ABSORBER
Filed May 13, 1936    2 Sheets-Sheet 2
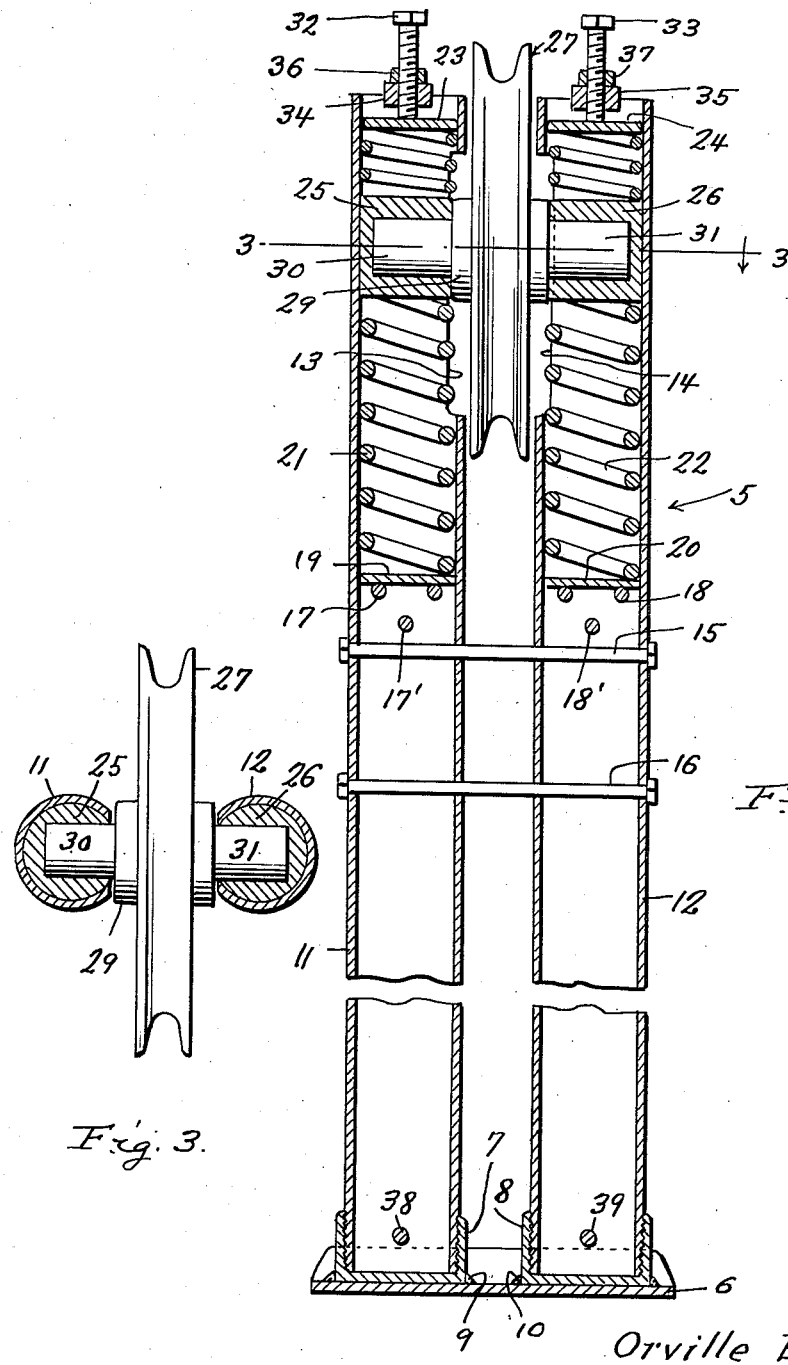
Inventor
Orville B. English
By Clarence A. O'Brien and
Hyman Berman, Attorneys Patented Oct. 19, 1937

2,096,392

UNITED STATES PATENT OFFICE 2,096,392

LINE SHOCK ABSORBER

Orville B. English, Okmulgee, Okla.

Application May 13, 1936, Serial No. 79,577

4 Claims. (Cl. 255—16)

My invention relates generally to a line shock absorber, and particularly to a line shock absorber especially adapted for use in supporting the line between the spudding pulley and the bullwheel of oil well drilling apparatus, and an important object of the invention is to provide a simple, inexpensive, and efficient shock absorber of this character.

Another important object of my invention is to provide a shock absorber of the character indicated which can be easily threaded by one man, and which is easily operable and maintained.

Other important objects of my invention will be apparent from a reading of the following description taken in connection with the drawings, wherein for purposes of illustration I have shown a preferred embodiment of my invention.

In the drawings:—

Figure 2 is a transverse vertical sectional view taken through Figure 1 approximately on the line 2—2.

Figure 3 is a horizontal sectional view taken approximately on the line 3—3 of Figure 2 and looking downwardly in the direction of the arrows.

Figure 1:
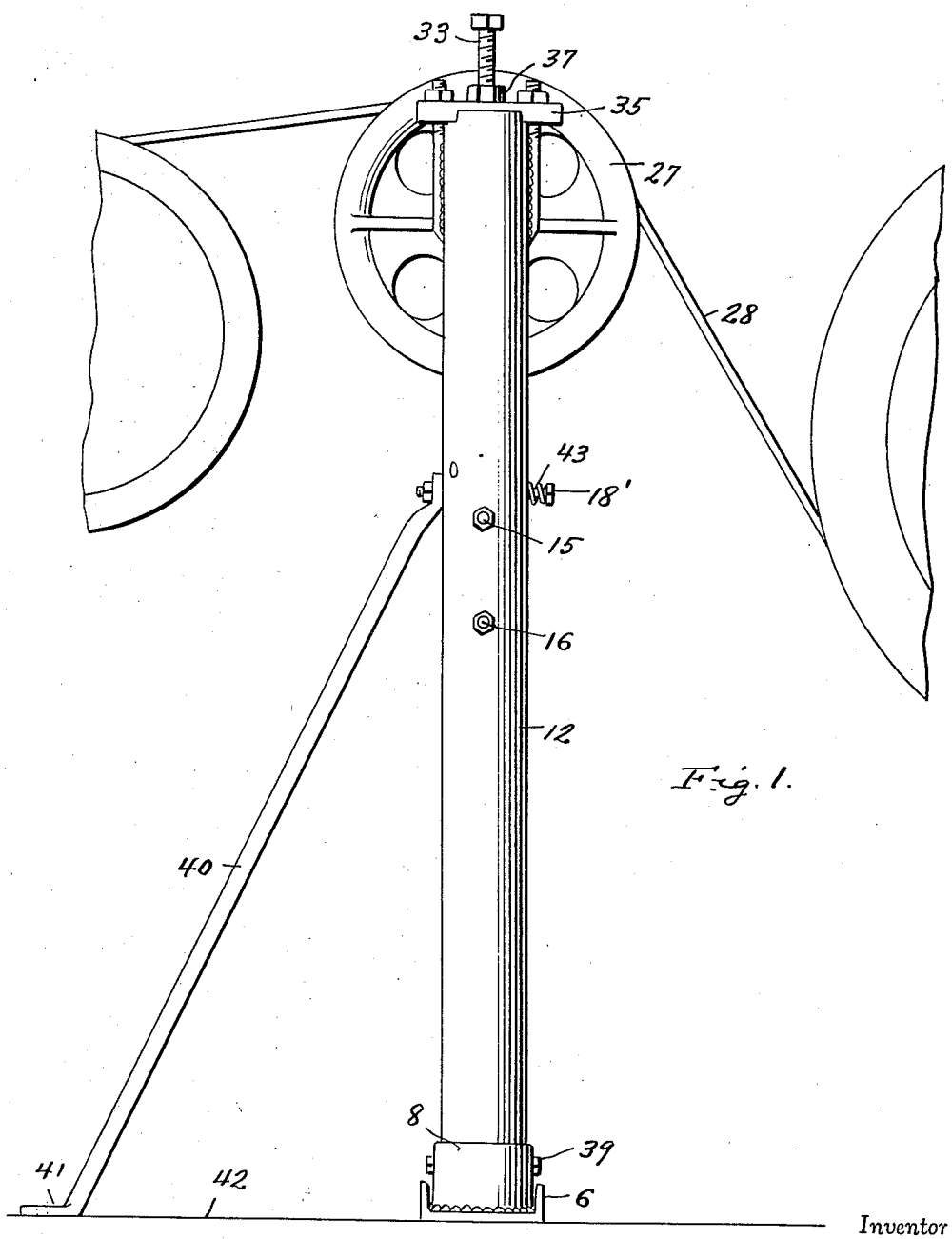
Figure 1 is a general side elevational view showing the device of the invention mounted in connection with a line running between a bullwheel and a spudding pulley.

Referring in detail to the drawings, the numeral 5 generally designates the line shock absorber of the present invention which comprises the plate 6 which is U-shaped in cross section and acts as the base on which are welded the threaded sockets 7 and 8 which are welded as indicated by the numerals 9 and 10, respectively, to the web of the base 6 and within the side flanges thereof.

Threaded into the sockets 7 and 8 are the pipes 11 and 12 forming the standards of the shock absorber, and these pipes are slotted as indicated by the numerals 13 and 14, respectively, adjacent their upper ends. The upper ends of the pipes are open.

Intermediate portions of the sides of the pipes 11 and 12 are traversed by the bracing bolts 15 and 16, while above the bolts 15 and 16 are bolts or rivets 17 and 18 which are arranged to form the supports for the lower spring plates 19 and 20, respectively, on which rest the lower ends of the helical springs 21 and 22 which are inserted thereabove in the pipes 11 and 12. Seated within the upper end of the pipes 11 and 12 above the slots 13 and 14 are the top spring plates 23 and 24 which compressibly engage the upper ends of the springs 21 and 22.

Journal blocks 25 and 26 are slidably mounted in the upper part of the pipes 11 and 12, respectively, between upper and lower portions of the respective springs 21 and 22. The grooved wheel 27 on which the line 28 runs has a hub portion 29 from the opposite sides of which project the reduced pintles 30 and 31 which turn in the journal blocks 25 and 26. The hub 29 properly spaces the journal blocks by bearing against the radially inward faces of the blocks, and in a manner to properly support the grooved wheel 27 between the standards 11 and 12. The pintles 30 and 31 work through the slots 13 and 14. With the weight of the line 28 on the grooved wheel 27, the upper and lower portions of the springs 21 and 22 act and react in accordance with the weight and pressure of the line.

For adjusting the compression of the springs 21 and 22 adjusting bolts 32 and 33 are supported in cross members 34 and 35 which are fixed to the upper ends of the standards. These bolts 32 and 33 engage the top spring plates 23 and 24, and respective lock nuts 36 and 37 are provided on the bolts 32 and 33 above the cross members 34, 35 to lock the screws in the adjusted positions.

Locking pins 38 and 39 traverse the lower part of the pipes 11 and 12 and the sockets 7 and 8, so as to prevent turning of the pipes in the sockets.

A diagonal brace 40 suitably fastened to the supporting surface 42 by the means generally indicated at 41, has its upper end engaged with the respective one of the bolts 17' and 18', said bolts having springs 43 which engage the opposite side of the respective standards, so that the connection to the standard of the brace 40 is spring-pressed and slidable on the axis of the bolt.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A line shock absorber comprising stationary standard means, duplex vertically acting spring means on said standard means, said spring means involving individual spring assemblies each comprising a journal carried thereby, and a grooved wheel having pintles projecting from its opposite sides and journaled in the corresponding journals.

2. A line shock absorber comprising a pair of standards, a spring on each standard, a journal on each standard and supported by the corresponding spring, a line pulley located between said standards and having pintles turning in said journals, each standard having a tubular part encasing the corresponding spring and journal and formed with an opening through which the related pintle projects.

3. A line shock absorber comprising a pair of standards, a spring on each standard, a journal on each standard and supported by the corresponding spring, a line pulley located between said standards and having pintles turning in said journals, each standard having a tubular part, the corresponding spring comprising a helix, a stop in said tubular part engaged by the lower end of the spring, and a longitudinally adjustable stop at the upper end of said tubular part engaging the upper end of said tubular part and engaging the upper end of the spring and adjustable to vary the tension of the spring.

4. A line shock absorber comprising a pair of standards, a spring on each standard, a journal on each standard and supported by the corresponding spring, a line pulley located between said standards and having pintles turning in said journals, each standard having a tubular part, the corresponding spring comprising a helix, a stop at the lower end of said tubular part engaged by the lower end of said spring, the corresponding journal being supportably connected with the helix intermediate the upper and lower ends of the helix.

ORVILLE B. ENGLISH.